(12) United States Patent
Hormann

(10) Patent No.: US 7,902,782 B2
(45) Date of Patent: Mar. 8, 2011

(54) METHOD OF OPERATING A DOOR DRIVE AND DOOR DRIVE

(75) Inventor: Michael Hormann, Halle/Westf. (DE)

(73) Assignee: Marantec Antriebs-Und Steuerungstechnik GmbH & Co. KG, Marienfeld (DE)

( * ) Notice: Subject to any disclaimer, the term of this patent is extended or adjusted under 35 U.S.C. 154(b) by 411 days.

(21) Appl. No.: 12/012,704

(22) Filed: Feb. 5, 2008

(65) Prior Publication Data
US 2008/0202029 A1 Aug. 28, 2008

(30) Foreign Application Priority Data
Feb. 6, 2007 (DE) .......... 10 2007 005 881

(51) Int. Cl.
*G05B 5/00* (2006.01)
(52) U.S. Cl. ......... 318/466; 318/280
(58) Field of Classification Search .......... 318/466, 318/468, 280, 286, 432, 471
See application file for complete search history.

(56) References Cited

U.S. PATENT DOCUMENTS

| 4,394,607 | A | * | 7/1983 | Lemirande | 318/453 |
| 4,449,078 | A | * | 5/1984 | Ogishi et al. | 318/102 |
| 5,334,876 | A | * | 8/1994 | Washeleski et al. | 307/10.1 |
| 5,929,580 | A | * | 7/1999 | Mullet et al. | 318/466 |
| 6,079,767 | A | * | 6/2000 | Faubert et al. | 296/155 |
| 6,118,243 | A | * | 9/2000 | Reed et al. | 318/468 |
| 6,435,600 | B1 | * | 8/2002 | Long et al. | 296/155 |
| 6,864,654 | B1 | * | 3/2005 | Letor et al. | 318/434 |
| 2003/0025470 | A1 | | 2/2003 | Fitzgibbon et al. | |

FOREIGN PATENT DOCUMENTS

| DE | 201 06 870 | 6/2001 |
| DE | 101 42 431 | 4/2003 |
| DE | 10 2004 002127 | 8/2005 |
| GB | 2378220 | 2/2003 |

* cited by examiner

*Primary Examiner* — Rina I Duda
(74) *Attorney, Agent, or Firm* — Dilworth & Barrese, LLP

(57) ABSTRACT

The present invention comprises a method for operating a door drive which includes at least one high-speed mode and at least one normal-speed mode, with the following steps: determining a load-dependent operating parameter of the door drive and changing from the high-speed mode into the normal-speed mode in dependence on the load-dependent operating parameter, in order to prevent an overload of the door drive. The invention likewise comprises a corresponding door drive.

20 Claims, 3 Drawing Sheets

METHOD OF OPERATING A DOOR DRIVE AND DOOR DRIVE

BACKGROUND OF THE INVENTION

The present invention relates to a method of operating a door drive which includes at least one high-speed mode and at least one normal-speed mode. The present invention also relates to such door drive with a corresponding control.

In the high-speed mode of these so-called high-speed drives, the door usually is opened at a higher speed and is closed at normal speed. In the normal mode, however, the door is moved at normal speed both when opening and when closing. Such high-speed drives are used in particular for rolling, revolving or sliding doors, and furthermore in particular for industrial doors, garage doors and/or courtyard doors.

The higher speed in the high-speed mode exerts great load on the door drive, whereas the lower speed in the normal mode saves the drive. To avoid an overload of the door drive, known door drives therefore usually are designed such that within a certain time interval only a firmly specified number of door operating cycles can be performed at the maximum speed. For instance, the drive maximally opens twice at high speed, whereas the succeeding cycles only are possible at normal speed. This limitation of the high-speed cycles also can refer to a period of e.g. 10, 30 or 60 minutes.

What is problematic with this drive is the fact that the high-speed function is not optimally available. The rigid control, which only considers the number of cycles within a certain fixed time interval, also prevents an operation in the high-speed mode when the door drive actually is not subjected to a great load after the admissible number of high-speed cycles, e.g. because the door runs very smoothly, and therefore could still be operated in the high-speed mode without the risk of an overload.

SUMMARY OF THE INVENTION

Therefore, it is the object of the present invention to provide a method for operating a door drive, which prevents an overload of the door drive and nevertheless ensures an optimum availability of the high-speed mode.

In accordance with the invention, this object is solved by a method and corresponding door drive according to the description herein. The method of the invention comprises the following steps: determining a load-dependent operating parameter of the door drive, changing from the high-speed mode into the normal-speed mode in dependence on the load-dependent operating parameter, in order to prevent an overload of the door drive. Advantageously, the door drive is operated in the high-speed mode, as long as the load-dependent operating parameter does not exceed a limit value, whereas it is operated in the normal-speed mode as soon as the load-dependent operating parameter exceeds the limit value.

The load-dependent operating parameter is a value which no longer only depends on the number of door operating cycles, but also on the actual load of the door drive during these door operating cycles. The load-dependent parameter is increased more by a high-speed cycle that exerts great load on the drive than by a high-speed cycle that exerts less load on the drive, but otherwise is identical, whereas according to the prior art each high-speed cycle was evaluated equal independent of the actual load of the drive.

Since the control in accordance with the invention does not depend on a fixed number of cycles, but on a load-dependent operating parameter of the door drive, the same can be adapted to the actual load of the door drive. As a result, the number of possible high-speed cycles no longer is constant and only time-controlled, but the actual load of the door drive is determined and the normal mode only is activated when there actually is a threat of overload of the drive system. The drive then automatically reduces its output power (e.g. the speed), when an overload must be expected based on the previous load of the system.

Due to the variable control of the speed in dependence on the actual load of the door drive, an overload of the door drive is avoided and the service life of the system is increased without unnecessarily restricting the availability of the high-speed mode. In contrast to conventional methods, in which a great safety distance was necessary between the high-speed cycles permitted during a time interval and the actually possible high-speed cycles, in order to prevent an overload for all possible applications, e.g. also with very heavy doors, very much more high-speed cycles usually can be performed due to the control on the basis of the real load of the door drive, so that e.g. light doors can be moved much more frequently without restriction. As a result, overdimensioning the drive for all possible applications no longer is necessary. Especially in the case of door drives operated to a different extent, considerable advantages thus are obtained in terms of costs and space requirement.

Advantageously, determining the load-dependent operating parameter comprises measuring the temperature of a component of the door drive, in particular of the motor or of the power electronics. The temperature of these components is dependent on the preceding load of the drive and thus provides for actuating the door drive in accordance with the invention.

Advantageously, the load-dependent operating parameter depends on the measured temperature and/or on the change of the measured temperature, wherein it corresponds in particular to the measured temperature or to the change of the measured temperature. Furthermore, more complex dependencies of the load-dependent operating parameter both on the temperature and on the change of temperature are also conceivable.

In contrast to known drives, which in part provide a temperature-dependent overload shut-down, the control of the invention provides for a permanent availability of the door drive by means of the temperature, at which merely the high-speed mode is omitted and the normal-speed mode is activated, when the temperature-dependent operating parameter exceeds a certain limit value. Nevertheless, an overload of the door drive thereby can safely be prevented.

For determining the temperature, however, additional sensors must be used, which increases the constructional effort for controlling the door drive. Therefore, determining the load-dependent operating parameter advantageously comprises determining the torque produced by the motor. The torque of the motor likewise is a clear indicator for the load of the drive unit, so that it can be used as a characteristic for the control in accordance with the invention. In the case of a d.c. motor, the electric current is proportional to the torque, so that the same can also be used for activation in accordance with the invention.

Furthermore, determining the load-dependent operating parameter therefore advantageously comprises determining the electric current and/or the electric power during operation of the drive motor of the door drive. The electric current or the electric power of the drive motor is a direct indicator for the load of the drive, so that the load-dependent operating parameter can be determined on the basis of these values. Since the electric current and/or the electric power usually are measured in any case and thus are available to the control as characteristics, the method of the invention can be used without a constructional change of the door drive by correspondingly adapting the control.

Furthermore, determining the load-dependent operating parameter advantageously comprises determining the maximum current and/or maximum electric power within a certain time interval. As in known door drives, the time interval can comprise e.g. the preceding 5, 10, 30 or 60 minutes. In contrast to this, however, there is not used a fixed number of cycles for determining whether switching from the high-speed mode to the normal-speed mode is necessary, but the maximum electric current and/or maximum electric power during this time interval. The same is connected much more closely with the actual load of the drive and thus provides for a better availability of the high-speed mode.

Furthermore, determining the load-dependent operating parameter advantageously comprises determining the integral over the electric current and/or electric power during a certain time interval. In particular, the load-dependent operating parameter advantageously corresponds to this integral over the electric current and/or electric power during a certain time interval. The time interval can in turn comprise e.g. the past 5, 10, 30 or 60 minutes. The integral over the electric current and/or electric power for operating the drive motor thus very precisely corresponds to the actual load of the door drive during this time interval, so that this provides for an optimum actuation of the door drive.

What is furthermore advantageously conceivable also are those actuations, which utilize both the integral over the electric current and/or electric power and the maximum electric current and/or maximum electric power within a certain time interval as characteristics. Thus, an actuation is obtained, with which the speed of the door drive is optimized even better with respect to the real load.

Advantageously, it is likewise possible to move the door with more than two different speeds, depending on the range in which the load-dependent operating parameter lies. A plurality of load-dependent operating parameters can also be used as characteristics with the aid of a more complex control. A continuously variable speed control also is possible on the basis of the load-dependent operating parameter(s).

The present invention furthermore comprises a door drive with a control which includes at least one high-speed mode and at least one normal-speed mode and which operates by one of the methods described above. Such door drive obviously has the same advantages as the method described above.

Advantageously, the door drive comprises a sensor unit, in particular for temperature measurement, for current measurement or for power measurement. By means of this sensor unit, the corresponding characteristics can be determined, on the basis of which the load-dependent operating parameter can be determined.

BRIEF DESCRIPTION OF THE DRAWINGS

The present invention will now be explained in detail with reference to the drawings, in which.

DESCRIPTION OF THE PREFERRED EMBODIMENTS

Figure 1:
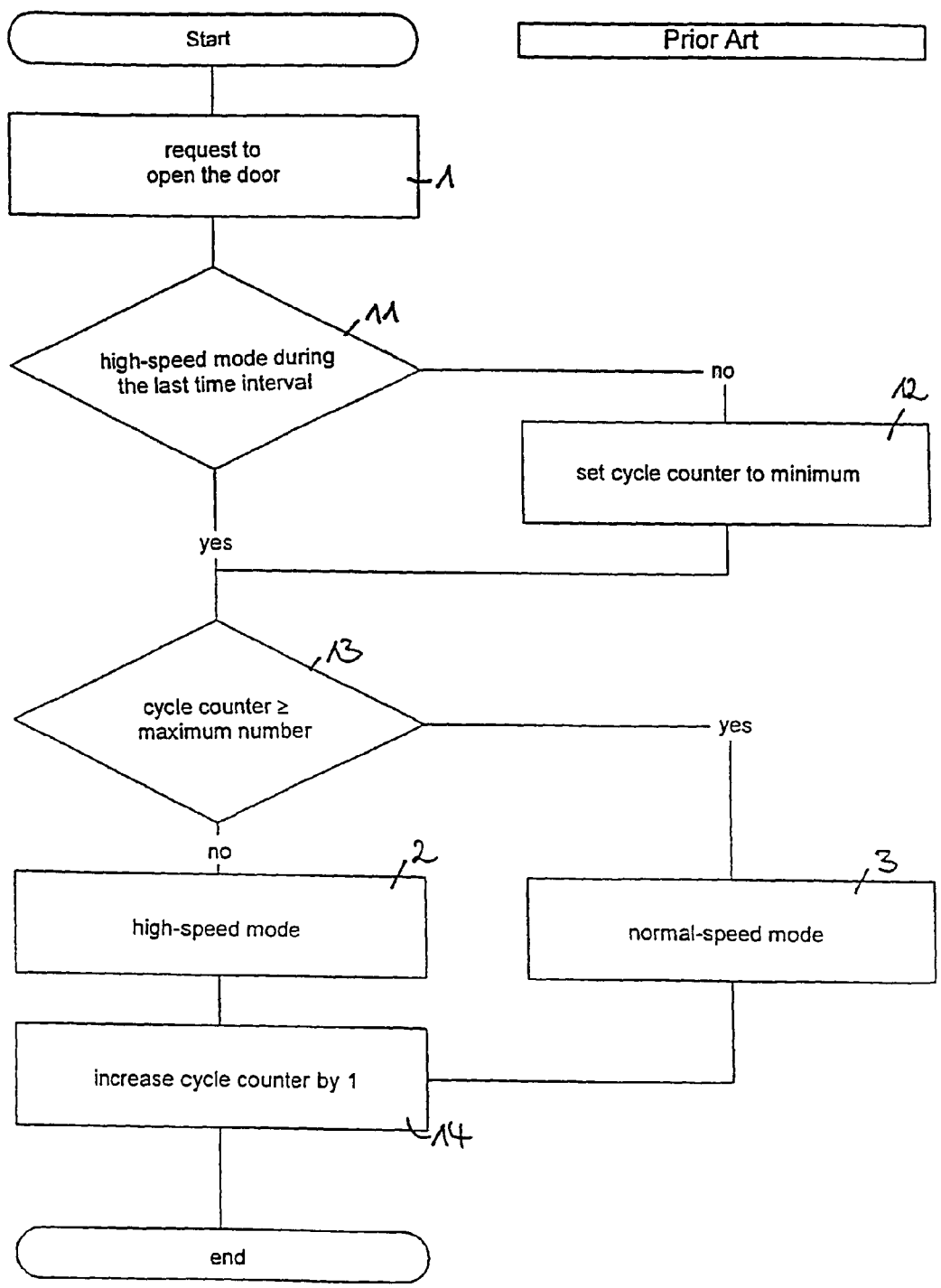
FIG. 1: shows a flow diagram of a method for operating a door drive in accordance with the prior art.

A method for operating a door drive in accordance with the prior art will again briefly be explained with reference to the flow diagram shown in FIG. 1. When the control of the door drive receives a request 1 for opening the door, it is initially checked there in a step 11 whether a high-speed operation has occurred within a certain time interval before receipt of the request signal 1. If no such high-speed operation has occurred, the cycle counter is set to minimum in a step 12, whereas otherwise step 13 will follow directly, in which the cycle counter is compared with the maximum admissible number of high-speed cycles. If the result of this comparison in step 13 is the fact that the cycle counter is smaller than the maximum admissible number of high-speed cycles, the control will switch into the high-speed mode 2, in order to open the door. Otherwise, it will switch into the normal-speed mode 3. In the next step 14, the cycle counter then is increased by 1.

As a result of this procedure, the choice between high-speed mode 2 and normal-speed mode 3 in step 13 only depends on the number of door operating cycles performed within a certain time interval, without considering the actual load of the door drive. In the case of smoothly running drives, this leads to the fact that the high-speed mode often is not available, even if the drive actually could still be operated in the high-speed mode without a risk of overload.

Figure 2:
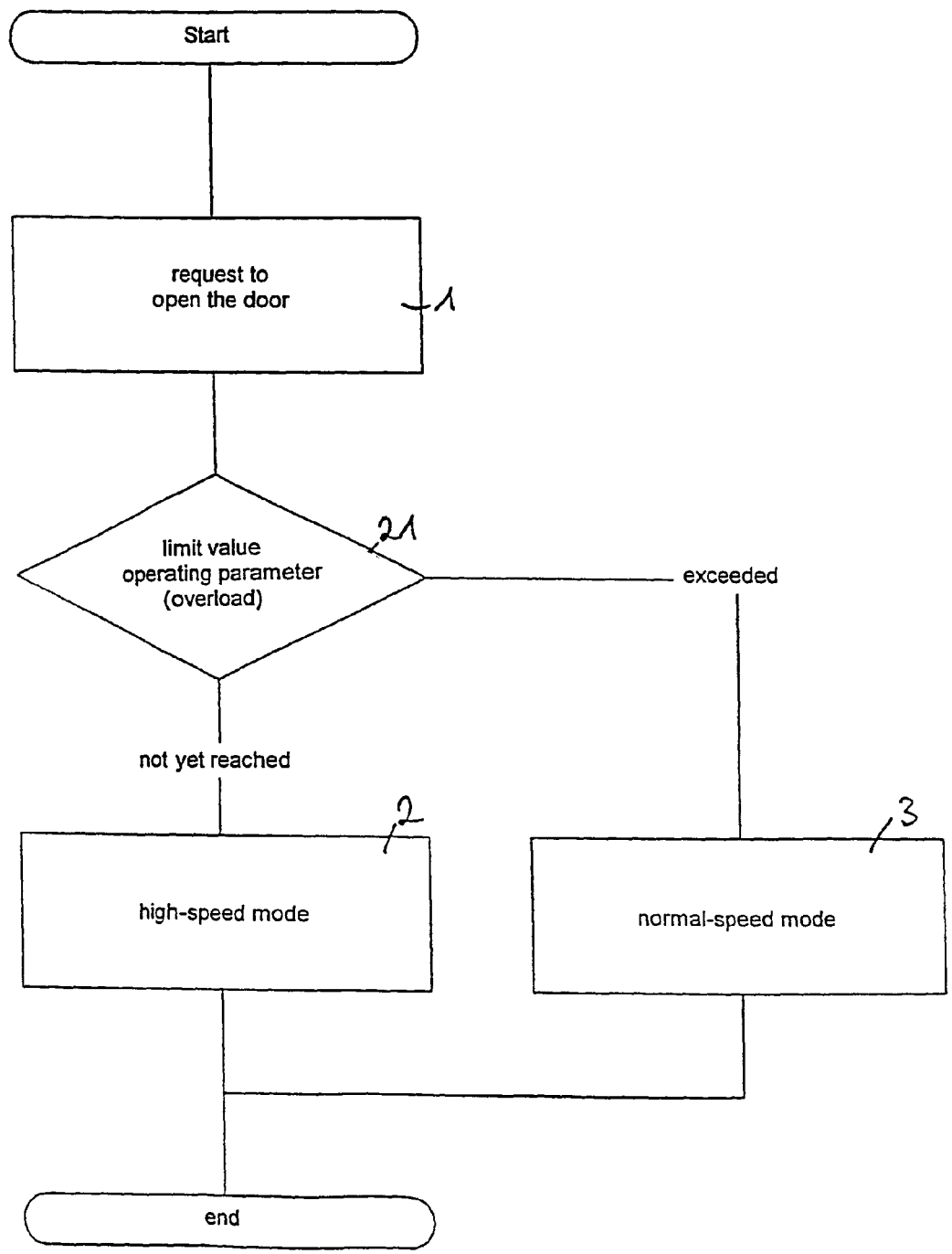
FIG. 2: shows a flow diagram of a method for operating a door drive in accordance with the present invention.
Figure 3:
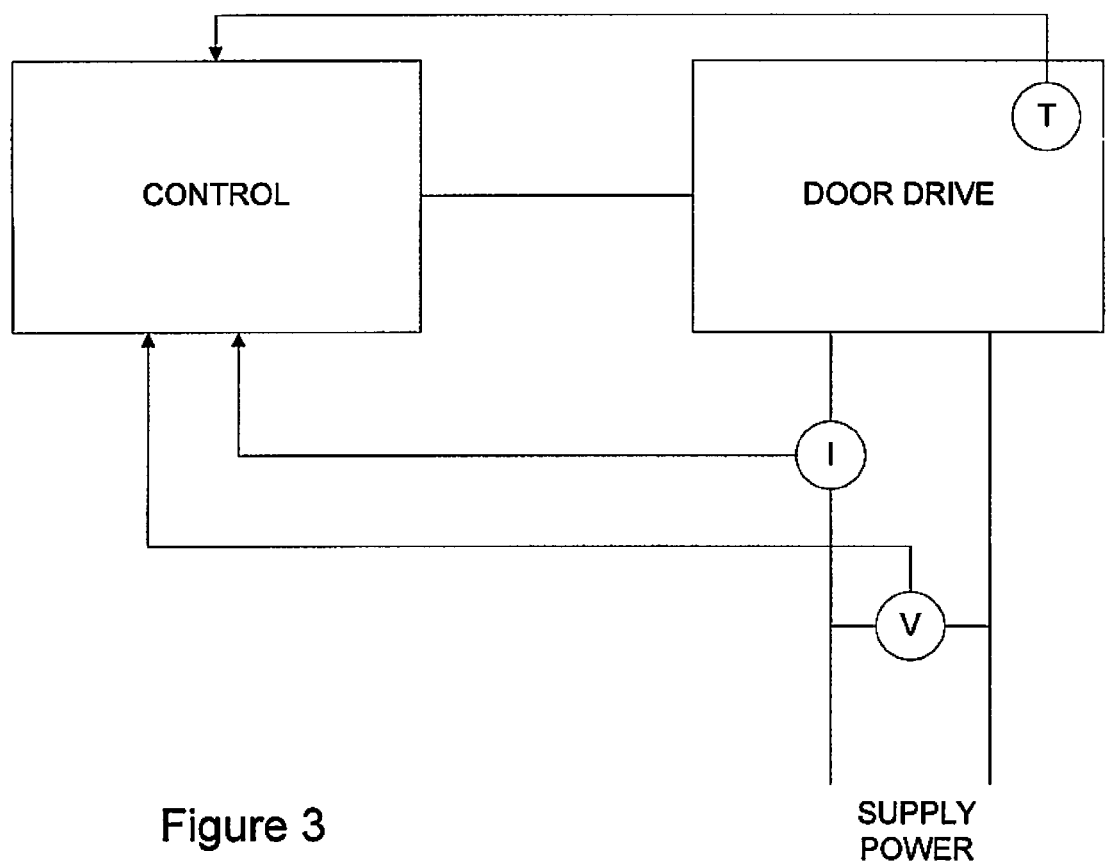
FIG. 3: shows a block diagram of a system for operating a door drive in accordance with the present invention.

The method of the invention will now be described in detail with reference to the flow diagram shown in FIG. 2 and the block diagram shown in FIG. 3. In step 21, a load-dependent operating parameter of the door drive is compared with a maximum admissible limit value in response to the request 1 to open the door. As a load-dependent operating parameter, e.g. the temperature of a component of the door drive or the change thereof can be used using temperature sensor T. Alternatively, the electric current and/or the electric power used for operating the drive motor of the door drive can be used for determining the load-dependent operating parameter, as the same accurately reflect the actual load of the drive, using current sensor I and/or voltage sensor V. In particular, the integral over the electric current and/or electric power can be detected during a certain time interval and can be used as a load-dependent parameter. If the load-dependent operating parameter exceeds the limit value, the normal-speed mode 3 will be activated, whereas otherwise the high-speed mode 2 will be used.

The comparison of the load-dependent operating parameter with a maximum admissible limit value in accordance with the invention as performed in step 21 thus allows to achieve a maximum availability of the high-speed mode 2, without a risk of overload being involved. Instead of the number of preceding door operating cycles, the actual load of the door drive by these preceding door operating cycles is considered.

The invention claimed is:

1. A method for operating a door drive which includes at least one high-speed mode and at least one normal-speed mode, comprising the following steps:
   determining a load-dependent operating parameter of the door drive, said load-dependent operating parameter being indicative of an overload of the door drive; and
   operating the door drive in high-speed mode in which the door is opened at a higher speed and is closed at a normal speed or in normal-speed mode in which the door is moved at normal speed both when opening and when closing in dependence on the load-dependent operating parameter, in order to prevent an overload of the door drive.

2. The method according to claim 1, wherein determining the load-dependent operating parameter comprises measuring the temperature of a component of the door drive, wherein the component of the door drive is at least one of a motor and power electronics.

3. The method according to claim 2, wherein the load-dependent operating parameter depends on the measured temperature and/or the change of the measured temperature, and corresponds to the measured temperature or the change of the measured temperature.

4. The method according to claim 1, wherein determining the load-dependent operating parameter comprises determining the torque produced by the motor.

5. The method according to claim 1, wherein determining the load-dependent operating parameter comprises determining the electric current and/or electric power during operation of the drive motor of the door drive.

6. The method according to claim 5, wherein determining the load-dependent operating parameter comprises determining the maximum electric current and/or maximum electric power within a certain time interval.

7. The method according to claim 5, wherein determining the load-dependent operating parameter comprises determining the integral over the electric current and/or electric power during a certain time interval and the load-dependent operating parameter corresponds to the integral over the electric current and/or electric power during a certain time interval.

8. A door drive with a control system which comprises at least one high-speed mode and at least one normal-speed mode, wherein said control performs the method steps according to claim 1.

9. The door drive according to claim 8, comprising a sensor unit, for temperature measurement, for current measurement or for power measurement.

10. A door drive with a control system which comprises at least one high-speed mode and at least one normal-speed mode, wherein said control performs the method steps according to claim 2.

11. A door drive with a control system which comprises at least one high-speed mode and at least one normal-speed mode, wherein said control performs the method steps according to claim 3.

12. A door drive with a control system which comprises at least one high-speed mode and at least one normal-speed mode, wherein said control performs the method steps according to claim 4.

13. A door drive with a control system which comprises at least one high-speed mode and at least one normal-speed mode, wherein said control performs the method steps according to claim 5.

14. A door drive with a control system which comprises at least one high-speed mode and at least one normal-speed mode, wherein said control performs the method steps according to claim 6.

15. A door drive with a control system which comprises at least one high-speed mode and at least one normal-speed mode, wherein said control performs the method steps according to claim 7.

16. The door drive according to claim 15, comprising a sensor unit, for temperature measurement, for current measurement or for power measurement.

17. The door drive according to claim 14, comprising a sensor unit, for temperature measurement, for current measurement or for power measurement.

18. The door drive according to claim 13, comprising a sensor unit, for temperature measurement, for current measurement or for power measurement.

19. The door drive according to claim 12, comprising a sensor unit, for temperature measurement, for current measurement or for power measurement.

20. The door drive according to claim 11, comprising a sensor unit, for temperature measurement, for current measurement or for power measurement.

* * * * *